United States Patent [19]

Tsujioka

[11] Patent Number: 5,296,955
[45] Date of Patent: Mar. 22, 1994

[54] LIQUID CRYSTAL DISPLAY APPARATUS WITH STABLE CONTRAST AGAINST TEMPERATURE CHANGES

[75] Inventor: Tomotoshi Tsujioka, Yamatokoriyama, Japan

[73] Assignee: Sharp Kabushiki Kaisha, Osaka, Japan

[21] Appl. No.: 986,616

[22] Filed: Dec. 7, 1992

[30] Foreign Application Priority Data

Dec. 10, 1991 [JP] Japan .................. 3-325955

[51] Int. Cl.$^5$ .................. G02F 1/133; G02F 1/135
[52] U.S. Cl. ........................ 359/73; 359/63; 359/102
[58] Field of Search ............ 359/73, 63, 101, 102, 359/70

[56] References Cited

U.S. PATENT DOCUMENTS

| | | | |
|---|---|---|---|
| 4,973,137 | 11/1990 | Kozaki | 359/73 |
| 4,984,873 | 1/1991 | Takiguchi et al. | 359/63 |
| 5,018,839 | 5/1991 | Yamamoto et al. | 359/73 |
| 5,119,220 | 6/1992 | Narita et al. | 359/63 |
| 5,126,868 | 6/1992 | Kizaki et al. | 359/73 |
| 5,136,405 | 8/1992 | Wada et al. | 359/53 |
| 5,166,817 | 11/1992 | Ota et al. | 359/73 |
| 5,194,975 | 3/1993 | Akatsuka et al. | 359/73 |

FOREIGN PATENT DOCUMENTS 64-0519  1/1989  Japan .

OTHER PUBLICATIONS

Yamamoto et al "Optimization of a Single-Cell Black & White ST LCD Using a Retardation Film" Japan Display '89-1989-pp. 332-334.

*Primary Examiner*—William L. Sikes
*Assistant Examiner*—Tai V. Duong

[57] ABSTRACT

A liquid crystal display apparatus has a lamination structure in which an upper polarizer, a phase difference plate, a supertwisted nematic liquid crystal cell sandwiched between upper and lower substrates, a lower polarizer, and a reflection plate are stacked in this sequence. In order to obtain an achromatic display which is stable against the temperature change, the retardation Re of the phase difference plate is set to 555 to 580 nm, the product d·Δn of the liquid crystal cell thickness and the refractive anisotropy of the liquid crystal display element is set to 0.76±0.02, the angle α formed by the liquid crystal molecular orientation axis of the upper substrate and the upper polarizer is set to 55 to 65 deg., the angle β formed by the liquid crystal molecular orientation axis of the lower substrate and the lower polarizer is set to 40 to 50 deg., the angle θ formed by the liquid crystal molecular orientation axis of the upper substrate and the optical axis of the phase difference plate is set to 120 to 130 deg., and the twisting angle of the liquid crystal molecule is set to 240 deg.

1 Claim, 2 Drawing Sheets

LIQUID CRYSTAL DISPLAY APPARATUS WITH STABLE CONTRAST AGAINST TEMPERATURE CHANGES

BACKGROUND OF THE INVENTION

1. Field of the Invention

The present invention relates to a liquid crystal display apparatus of the supertwisted nematic type (hereinafter, referred to as "STN-LCD") provided with a phase difference plate as a color compensation plate, and particularly to a liquid crystal display apparatus such as a black-and-white STN-LCD which can be used in an OA (Office Automation) apparatus, for example, a word processor.

2. Description of the Prior Art

In conventional reflection type STN-LCDs provided with a phase difference plate as a color compensation plate, the product (d·Δn) of the cell thickness and the refractive anisotropy is in the range of 0.81 to 0.83 μm, and the retardation (Re) of the phase difference plate is 565 nm. The angle (α) formed by the liquid crystal molecular orientation axis of an upper substrate and an upper polarizer is about 50 deg., the angle (β) formed by the liquid crystal molecular orientation axis of a lower substrate and a lower polarizer is about 50 deg., the angle (θ) formed by the liquid crystal molecular orientation axis of the upper substrate and the optical axis of the phase difference plate is about 105 deg., and the twisting angle (φ) of the liquid crystal molecule is about 240 deg.

The prior art STN-LCDs provided with a phase difference plate have the following problems:

(a) the background is colored in light green;

(b) the chromaticity changes largely as the temperature changes, and therefore a contrast which is stable against the temperature change cannot be obtained; and (c) the chromaticity changes largely with the variations of the cell thickness and the retardation of the phase difference plate.

SUMMARY OF THE INVENTION

It is an object of the invention to provide a liquid crystal display apparatus which can solve the above-mentioned problems and obtain a stable black-and-white monochromatic display and contrast.

The invention provides a liquid crystal display apparatus having a lamination structure in which, an upper polarizer, a phase difference plate, a liquid crystal display element where a supertwisted nematic liquid crystal is sandwiched between upper and lower substrates, a lower polarizer, and a reflection plate which reflects incident light from the side of the phase difference plate are stacked in this sequence, wherein.

The retardation Re of the phase difference plate is in the range of 555 to 580 nm, the product d·Δn of the cell thickness and the refractive anisotropy of the liquid crystal display element is in the range of 0.76±0.02 μm, the angle α formed by the liquid crystal molecular orientation axis of the upper substrate and the upper polarizer is in the range of 55 to 65 deg., the angle β formed by the liquid crystal molecular orientation axis of the lower substrate and the lower polarization axis is in the range of 40 to 50 deg., the angle θ formed by the liquid crystal molecular orientation axis of the upper substrate and the optical axis of the phase difference plate is in the range of 120 to 130 deg., and the twisting angle φ of the liquid crystal molecule is 240 deg.

According to the invention, the values of d·Δn, Re, α, β, θ and φ are optimized, so that the color tone of the STN-LCD can be put to an achromatic color as close as possible, a stable black-and-white monochromatic display can be realized, and a contrast which is stable against the temperature change is obtained.

The values of d·Δn, Re, α, β, θ and φ mutually interact with each other. When any one of these values fails to fall within the above-defined ranges, it is not possible to obtain a stable black-and-white monochromatic display and the following troubles arise:

(1) the background is colored;

(2) the color of activated pixels is not black;

(3) the positive display is not a normally-white display; and (4) the background is dark and a sufficiently high contrast cannot be obtained.

As described above, the invention can provide a liquid crystal display apparatus in which the color tone is an achromatic color and which can obtain a stable black-and-white monochromatic display and a contrast stable against the temperature change.

BRIEF DESCRIPTION OF THE DRAWINGS

Other and further objects, features, and advantages of the invention will be more explicit from the following detailed description taken with reference to the drawings wherein.

DESCRIPTION OF THE PREFERRED EMBODIMENTS

Figure 1:
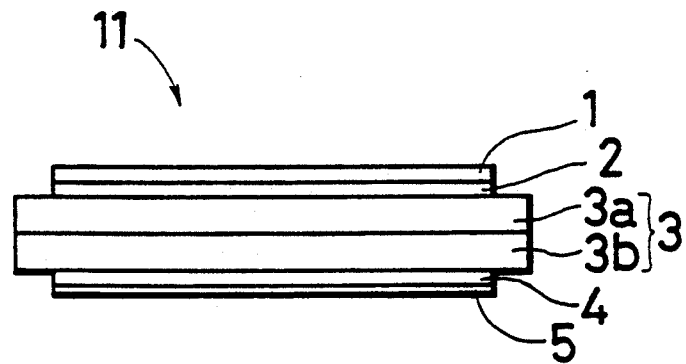
FIG. 1 is a sectional view showing the configuration of an embodiment of the invention.

Now referring to the drawing, preferred embodiments of the invention are described below.

Figure 2:
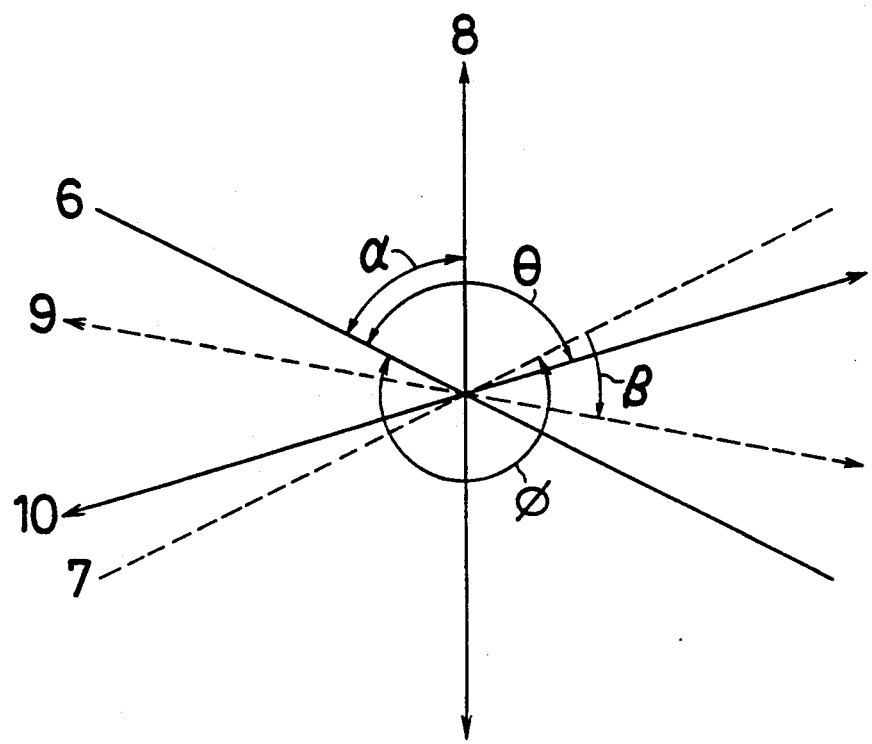
FIG. 2 is a plan view showing the positional relationship in the embodiment of the invention.

FIG. 1 is a sectional view showing the configuration of a liquid crystal display apparatus 11 which is an embodiment, and FIG. 2 is a plan view showing the positional relationship of in the liquid crystal display apparatus 11.

The liquid crystal display apparatus 11 has a lamination structure in which an upper polarizer 1, a phase difference plate 2, an STN liquid crystal cell 3, a lower polarizer 4, and a reflection plate 5 are stacked in this sequence.

The upper polarizer 1 is a polarizer having a single transmissivity of 42% and a degree of polarization of 99.99%. The phase difference plate 2 is a uniaxial high molecular polycarbonate film having a retardation (Re) of 565 nm. The STN liquid crystal cell 3 is a panel in which the twisting angle (φ) of the liquid crystal molecule is set to 240 deg. and d·Δn (d is the cell thickness, and Δn is the refractive anisotropy of the liquid crystal) is set to 0.76 μm. The lower polarizer 4 is a polarizer having a single transmissivity of 45% and a degree of polarization of 98%. The reflection plate 5 is a nondirectional evaporation coating reflection plate. These components were stacked as shown in FIG. 1 to constitute the reflection type liquid crystal display apparatus 11.

Among arrows in FIG. 2, arrow 6 indicates the liquid crystal molecular orientation axis of an upper substrate 3a constituting the STN liquid crystal cell 3. Arrow 7 indicates the liquid crystal molecular orientation axis of a lower substrate 3b constituting the STN liquid crystal cell 3. Arrow 8 indicates the absorption axis of the upper polarizer 1. Arrow 9 indicates the absorption axis of the lower polarizer 4. Arrow 10 indicates the optical axis (drawing direction) of the phase difference plate 2. The angle $\alpha$ is an angle formed by the liquid crystal molecular orientation axis 6 of the upper substrate 3a and the absorption axis 8 of the upper polarizer 1. The angle $\beta$ is an angle formed by the liquid crystal molecular orientation axis 7 of the lower substrate 3b and the absorption axis 9 of the lower polarizer 4. The angle $\theta$ is an angle formed by the liquid crystal molecular orientation axis 6 of the upper substrate 3a and the optical axis 10 of the phase difference plate. The angle $\phi$ is the twisting angle of the liquid crystal molecule.

In the embodiment, the components are disposed so that the conditions of $\alpha=60$ deg., $\beta=45$ deg. and $\theta=125$ deg. are satisfied.

Figure 3:
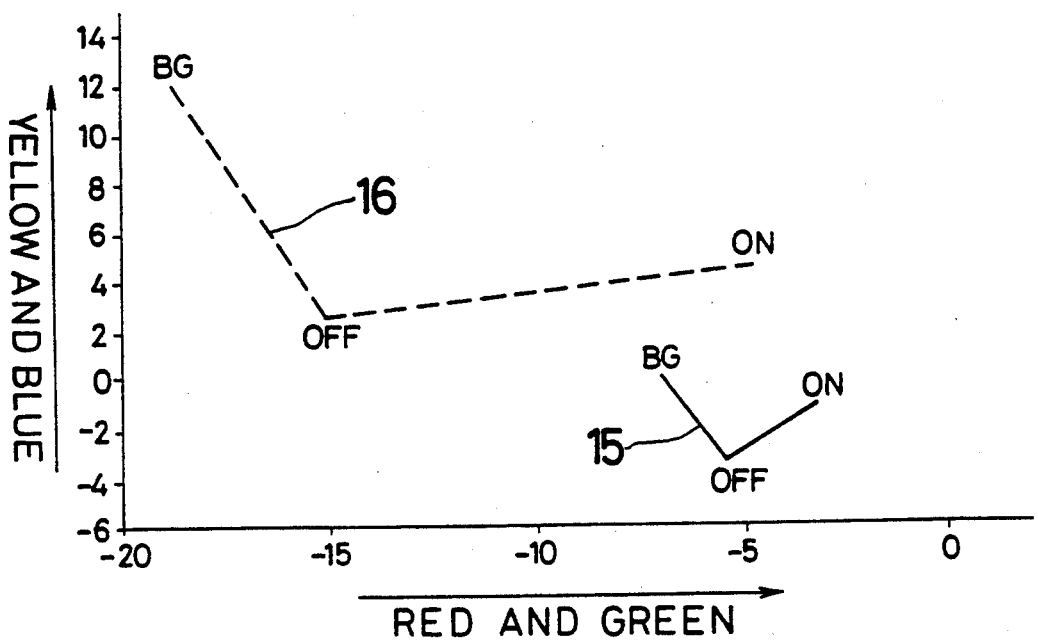
FIG. 3 is a graph showing the CIE chromaticities of the embodiment of the invention and a prior art apparatus.
Figure 4:
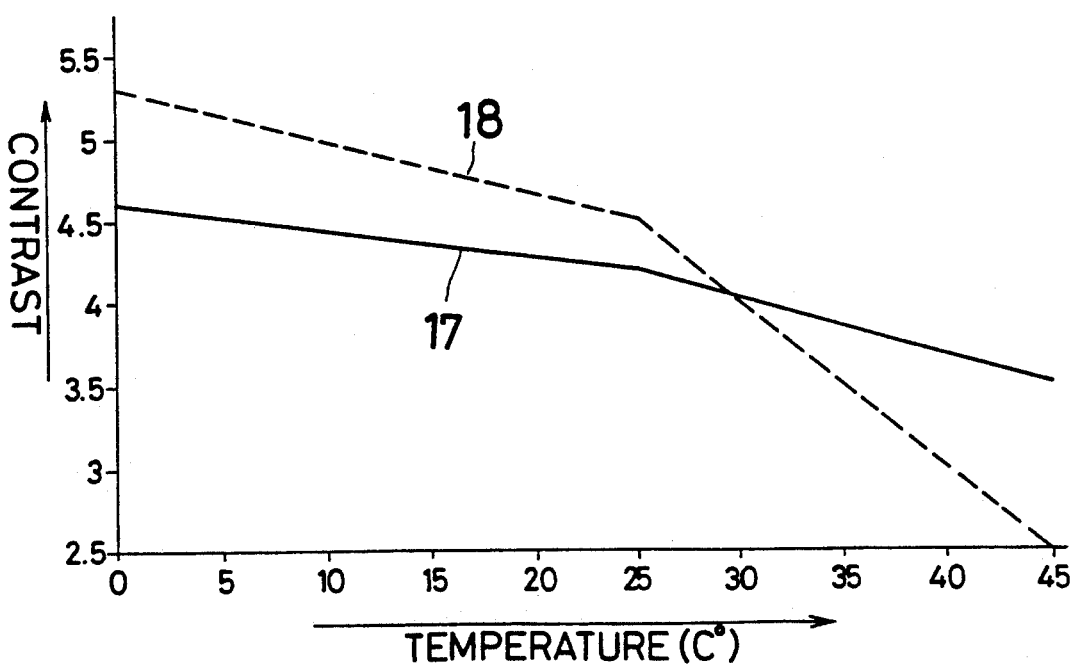
FIG. 4 is a graph showing the changes in contrast against the temperature change in the embodiment of the invention and a prior art apparatus.

FIG. 3 is a graph showing the CIE chromaticities, and FIG. 4 is a graph showing the change in contrast against the temperature change.

In FIG. 3, the axis of abscissas indicates the amounts of red and green, the position "0" corresponds to a color which is close to an achromatic color, and green becomes deeper with the progress toward the left (negative) side and red becomes deeper with the progress toward the right (positive) side. In contrast, the axis of ordinates indicates the amount of yellow and blue, the position "0" corresponds to a color which is close to an achromatic color, and yellow becomes deeper with the upward (negative) progress and blue becomes deeper with the downward (positive) progress. Therefore, in the chromaticity coordinates of the embodiment indicated by solid line 15, all of the background (B·G) points, the OFF point and the ON point are positioned closer to the origin as compared with the chromaticity coordinates of the prior art indicated by broken line 16, or indicate a color which is close to an achromatic color.

In FIG. 4, solid line 17 indicates the contrast change against the temperature change (0° to 45° C.) in the embodiment, and broken line 18 the contrast change against the same temperature change in the prior art. It will be seen from FIG. 4 that, in the embodiment, the contrast change against the temperature change is smaller than that of the prior art and a stable color tone can be obtained.

Table 1 below shows a comparison between the maximum color difference of the embodiment caused by the variations of the cell thickness and the retardation of the phase difference plate and that of the prior art.

In this comparison, the variation range of the cell thickness is 6.0±0.2 μm, and that of the retardation of the phase difference plate is 555 to 580 nm.

TABLE 1

| Sample | STN-LCD of embodiment | STN-LCD of prior art |
| --- | --- | --- |
| Max. color difference | 13.89 | 14.93 |

In the above, the maximum color difference means a distance in the CIE chromaticity coordinates. As described above, it will be seen that the embodiment can provide a color tone which is more stable against the variations of the cell thickness and the retardation of the phase difference plate, as compared with the prior art.

In this way, the optimization of d·$\Delta$n and Re of the STN liquid crystal panel and the axis angles of the polarizers and phase difference plate enables a more achromatic black-and-white monochromatic display to be obtained, and also a display which is stable against the temperature change and the variations of the cell thickness and the retardation of the phase difference plate to be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:
    a lamination structure in which an upper polarizer, a phase difference plate, a liquid crystal display element where a supertwisted nematic liquid crystal is sandwiched between upper and lower substrates, a lower polarizer, and a reflection plate which reflects incident light from the side of the phase difference plate are stacked in this sequence, wherein the retardation Re of the phase difference plate is in the range of 555 to 580 nm, the product d·$\Delta$n of the cell thickness and the refractive anisotrophy of the liquid crystal display element is in the range of 0.76±0.02 μm, the angle $\alpha$ formed by the liquid crystal molecular orientation axis of the upper substrate and the upper polarizer is in the range of 55 to 65 deg., the angle $\beta$ formed by the liquid crystal molecular orientation axis of the lower substrate and the lower polarization axis is in the range of 40 to 50 deg., the angle $\theta$ formed by the liquid crystal molecular orientation axis of the upper substrate and the optical axis of the phase difference plate is in the range of 120 to 130 deg., and the twisting angle $\Phi$ of the liquid crystal molecule is 240 deg. to thereby enable the display to maintain a stable contrast irrespective of temperature changes.

* * * * *